United States Statutory Invention Registration [19]

[11] Reg. Number: H1001

Thackara

[43] Published: Dec. 3, 1991

[54] METHOD OF TRANSFERRING AN OPTICAL QUALITY FILM

[75] Inventor: John I. Thackara, Sunnyvale, Calif.

[73] Assignee: The United States of Amercia as represented by the Secretary of the Army, Washington, D.C.

[21] Appl. No.: 416,681

[22] Filed: Sep. 21, 1989

[51] Int. Cl.[5] ..... B05D 5/12; C25D 5/00; C25D 5/12

[52] U.S. Cl. ..... 427/124; 205/183

*Primary Examiner*—John S. Maples
*Assistant Examiner*—Philip Tucker
*Attorney, Agent, or Firm*—Michael J. Zelenka; Roy E. Gordon

[57] ABSTRACT

An optical quality film is transferred from a master optical surface to a secondary substrate by means of a replication technique using a master optical surface as a mold.

4 Claims, 1 Drawing Sheet

A statutory invention registration is not a patent. It has the defensive attributes of a patent but does not have the enforceable attributes of a patent. No article or advertisement or the like may use the term patent, or any term suggestive of a patent, when referring to a statutory invention registration. For more specific information on the rights associated with a statutory invention registration see 35 U.S.C. 157.

METHOD OF TRANSFERRING AN OPTICAL QUALITY FILM

The Government has rights in this invention under Contract No. DAAL01-85-C-0197 with the Department of the Army.

This invention relates in general to a method of providing an optical quality film and in particular, to a method of transferring an optical quality film from a master optical surface to a secondary substrate by means of a replication technique using a master optical surface as a mold.

BACKGROUND OF THE INVENTION

High frequency integrated optic (IO) devices employing electrodes above and below the thin-film IO structures require an optically smooth lower electrode(s) of excellent conductivity to be formed on the device substrate. The fabrication of optical surfaces in metal substrates is difficult and usually requires techniques such as diamond turning.

More particularly, it has been difficult to achieve sufficient thickness in optical quality electrodes formed by evaporation or sputtering onto optical quality substrates. Electroplating alone has resulted in rough exposed surfaces.

SUMMARY OF THE INVENTION

The general object of this invention is to provide a method of obtaining a metal surface of sufficient critical quality to serve as a substrate for IO devices and of sufficient thickness to serve as an electrode(s) for high frequency IO devices. It is a further object of the invention to provide such a method that does not require high temperature bonding. A still further object of the invention is to provide a method of transferring an optical quality film from a master optical surface to a secondary substrate.

It has now been found that the aforementioned objects can be attained by means of a replication technique using a master optical surface as a mold.

The method described here allows relatively thick metal films of excellent conductivity and of high optical quality to be transferred to a secondary or device substrate.

The method, that is relatively easy to implement, produces optically smooth metal surfaces of excellent conductivity needed for high frequency IO devices. The resulting metal-optics surface need not be flat and such structures may find use in other areas such as metal mirrors.

DESCRIPTION OF THE DRAWING AND THE PREFERRED EMBODIMENT

Figure 1:
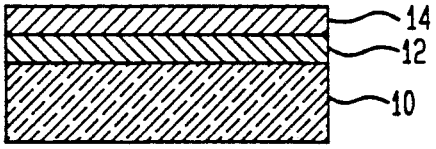
FIG. 1 shows the evaporation deposition of an adhesion film followed by a conductive film onto a master substrate while exposing the assembly to air between evaporations.

The steps involved in carrying out the invention and transferring an optical quality film from a master optical surface to a secondary substrate are shown in FIGS. 1 to 4 of the drawing wherein a chrome film is used for adhesion and a copper film is the transferred film.

Referring to FIG. 1, onto an optical quality master substrate, 10, there is first evaporation deposited a chrome film, 12, of about 1000 angstroms in thickness for adhesion followed by the evaporation deposit of a copper film, 14, of about 1000 angstroms in thickness. The assembly is exposed to air between evaporations.

Figure 2:
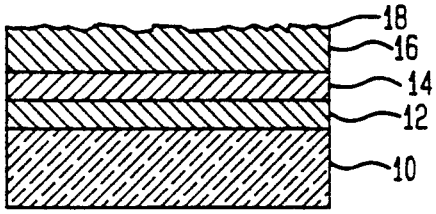
FIG. 2 shows the electroplating of a layer of the same conductive film onto the conductive film of FIG. 1 of sufficient thickness to achieve the necessary conductivity in the electroplated layer.

Referring to FIG. 2, a copper layer, 16, is electroplated onto the copper film, 14 of sufficient thickness to achieve the necessary conductivity in the copper layer, 16. The copper layer, 16 has a naturally rough surface, 18.

Figure 3:
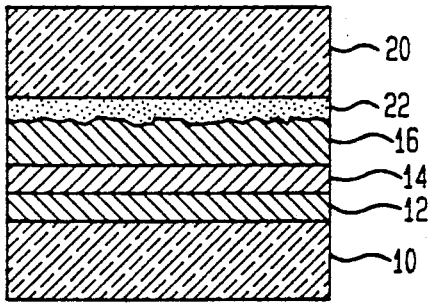
FIG. 3 shows the bonding of a secondary substrate to the electroplated layer with a replication cement.

Referring to FIG. 3, a secondary or device substrate, 20 is bonded to the electroplated copper layer, 16 with replication cement, 22. The naturally rough surface, 18 of the electroplated layer, 16 facilitates good adhesion of the cement, 22.

Figure 4:
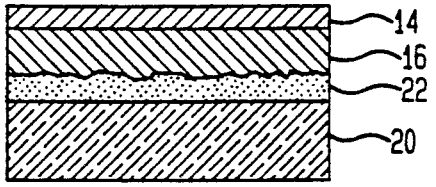
FIG. 4 shows the separation of the secondary substrate and both bonded conductive layers from the adhesion coated master leaving the optical quality surface of the conductive electrode exposed.

Referring to FIG. 4, the device substrate, 20 and both bonded copper layers, 16 and 14, are separated from the chrome coated master, 12 and 10, leaving the optical quality surface of the copper electrode exposed.

In the foregoing method, the optical quality master substrate, 10 can be composed of glass, fused silicon, plaster, and the like.

The secondary or device substrate can be composed of glass, metals, plastics, etc.

The replication cement used is a low shrink cement.

I wish it to be understood that I do not desire to be limited to the exact details of construction shown and described for obvious modifications will occur to a person skilled in the art.

What is claimed is:

1. Method of transferring a relatively thick metal film of excellent conductivity and of high optical quality to a secondary substrate from a master substrate, said method including the steps of:

(A) evaporation depositing an adhesion film followed by a conductive film onto a master substrate while exposing the assembly to air between evaporations, (B) electroplating a layer of the same conductive film onto the conductive film of step (A) of sufficient thickness to achieve the necessary conductivity in the electroplated layer, (C) bonding a secondary substrate to the electroplated layer with a replication cement, and (D) separating the secondary substrate and both bonded conductive layers from the adhesion coated master leaving the optical quality surface of the conductive electrode exposed.

2. Method according to claim 1 wherein the adhesion film is a chrome film and wherein the conductive film is copper.

3. Method according to claim 2 wherein each of the films of claim 2 is about 1000Å in thickness.

4. Method according to claim 1 wherein in step (B), electroplating is carried in a solution containing 400 parts water, 100 parts $CuSO_4 \cdot 5H_2O$, and 4–10 parts $H_2SO_4$.

* * * * *